United States Patent
Iwashima

(10) Patent No.: US 8,305,598 B2
(45) Date of Patent: Nov. 6, 2012

(54) IMAGE-FORMING APPARATUS

(75) Inventor: Yasuhiro Iwashima, Osaka (JP)

(73) Assignee: KYOCERA Document Solutions Inc. (JP)

( * ) Notice: Subject to any disclaimer, the term of this patent is extended or adjusted under 35 U.S.C. 154(b) by 880 days.

(21) Appl. No.: 12/413,154

(22) Filed: Mar. 27, 2009

(65) Prior Publication Data

US 2010/0014113 A1 Jan. 21, 2010

(30) Foreign Application Priority Data

Jul. 16, 2008 (JP) ................. 2008-184960

(51) Int. Cl.
*G06K 15/00* (2006.01)

(52) U.S. Cl. ...... 358/1.14; 358/1.1; 358/1.13; 358/1.15; 358/1.16; 713/300; 713/310; 713/320; 713/323; 713/324

(58) Field of Classification Search .................. None
See application file for complete search history.

(56) References Cited

U.S. PATENT DOCUMENTS

| | | | | |
|---|---|---|---|---|
| 6,081,752 | A * | 6/2000 | Benson et al. ............... | 700/79 |
| 7,894,085 | B2 * | 2/2011 | Maeda ....................... | 358/1.13 |
| 2004/0263872 | A1 * | 12/2004 | Uchiyama .................. | 358/1.2 |
| 2006/0184810 | A1 | 8/2006 | Hamaguchi et al. | |
| 2007/0196099 | A1 * | 8/2007 | Ishiyama et al. ............. | 396/301 |
| 2007/0201089 | A1 | 8/2007 | Yamamoto | |
| 2008/0259378 | A1 * | 10/2008 | Suzuki ........................ | 358/1.14 |
| 2009/0073490 | A1 * | 3/2009 | Kawata et al. .............. | 358/1.16 |
| 2009/0193178 | A1 * | 7/2009 | Warren et al. ............... | 711/103 |

FOREIGN PATENT DOCUMENTS

| | | |
|---|---|---|
| JP | 08-324071 | 12/1996 |
| JP | 10-336355 | 12/1998 |
| JP | 2003-283725 | 10/2003 |
| JP | 2006-229310 | 8/2006 |
| JP | 2007-090779 | 4/2007 |
| JP | 2007-223275 | 9/2007 |
| JP | 2007-251433 | 9/2007 |
| JP | 2008-044106 | 2/2008 |

* cited by examiner

*Primary Examiner* — Twyler Haskins
*Assistant Examiner* — Miya J Cato
(74) *Attorney, Agent, or Firm* — McDonnell Boehnen Hulbert & Berghoff LLP

(57) ABSTRACT

An image-forming apparatus has an image-forming mode during which an image is formed on a recording medium and a power-saving mode in which power consumption is reduced relative to in the image-forming mode, and comprises: a continuously-powered unit powered in the image-forming mode and the power-saving mode; and a non-continuously-powered unit powered in the image-forming mode but not in the power-saving mode, wherein the continuously-powered unit includes: a communication unit connected with an external network; a storage unit storing data input via the communication unit; and a processing unit performing processing based on data stored in the storage unit when the power-saving mode is switched to the image-forming mode.

20 Claims, 5 Drawing Sheets

IMAGE-FORMING APPARATUS

INCORPORATION BY REFERENCE

This application is based upon and claims the benefit of priority from corresponding Japanese Patent Application No. 2008-184960, filed Jul. 16, 2008, the entire contents of which are incorporated herein by reference.

FIELD OF THE INVENTION

The present invention relates to an image-forming apparatus.

RELATED BACKGROUND OF THE INVENTION

Conventionally, an image-forming apparatus, such as a printer or facsimile machine, has a power-saving mode in order to reduce power consumption. In the power-saving mode, the apparatus is in a standby state in which power to components used for image formation is stopped. Having such a power-saving mode makes it possible to reduce power consumption in the standby state.

In addition, in recent years, an image-forming apparatus may be connected with a plurality of user terminals via a network. Then, it is possible for users at the terminals to transmit data to or receive data from a storage data in the image-forming apparatus. Data stored in an image-forming apparatus includes, for example, the amount of remaining printing paper, the kind of printing paper set in a cassette, etc.

If all of the functions of the image-forming apparatus connected via such a network are deactivated due to the power-saving mode, at that time the users are no longer able to acquire data stored in the image-forming apparatus.

In some cases, a user may not only acquire necessary data from an image-forming apparatus via a network, but may also make settings to the image-forming apparatus via the network. That is, there may be occasions where a user inputs data other than an instruction to form an image to the image-forming apparatus via the network.

In the conventional image-forming apparatus, when data to make such a setting is input via the network, the power-saving mode is cancelled by powering up each constituent part and then making the setting based on the inputted data.

Because of this, even though only a setting is being made to the image-forming apparatus (rather than an image formation instruction), the power-saving mode is cancelled and power consumption increases.

Moreover, when the image-forming apparatus is connected with a plurality of user terminals via a network as described above, a user cannot visually recognize the image-forming apparatus from his/her terminal, and therefore, the user cannot know whether the image-forming apparatus is in the power-saving mode or not.

Thus, the power-saving mode is cancelled frequently in the image-forming apparatus, resulting in possible decreased effectiveness in reducing power consumption in the power-saving mode.

SUMMARY OF THE INVENTION

The present invention has been developed in view of the above-described problems, and an object thereof is to further reduce power consumption in an image-forming apparatus.

An image-forming apparatus according to an embodiment of the present invention has an image-forming mode during which images are formed on a recording medium and a power-saving mode in which power consumption is reduced relative to in the image-forming mode, and adopts a configuration comprising a continuously-powered unit powered in the image-forming mode and the power-saving mode and a non-continuously-powered unit powered in the image-forming mode but not in the energy-saving mode, wherein the continuously-powered unit includes: a communication unit connected with an external network; a storage unit storing setting data for making settings to the continuously-powered unit and the non-continuously-powered unit when the data is received from the external network via the communication unit; and a processing unit performing processing based on the setting data stored in the storage unit when the power-saving mode is switched to the image-forming mode by an external operation.

In the above-mentioned configuration, when the image-forming apparatus is set to the power-saving mode, data to be input into the image-forming apparatus from outside via the communication unit is stored temporarily in the storage unit included in the continuously powered unit. Then, when the power-saving mode is switched to the image-forming mode, the processing unit performs processing based on the data stored in the storage unit.

That is, even when data is input from outside via the communication unit, the data is stored in the storage unit included in the continuously powered unit until the mode is switched from the power-saving mode to the image-forming mode.

Because of this, even when data is input from outside in the power-saving mode, the power-saving mode is not cancelled.

Consequently, the present invention makes it possible to further reduce power consumption in the image-forming apparatus.

Still other objects of the present invention and specific advantages that can be obtained from the present invention will be further clarified from the description of embodiments given below.

DESCRIPTION OF THE PREFERRED EMBODIMENTS

An embodiment of an image-forming apparatus according to the present invention will be described below with reference to the drawings. In the following drawings, the scale of each member is changed appropriately in order to make the size of each member recognizable. In addition, in the following description, as an example of the image-forming apparatus of the present invention, a multifunction peripheral is taken for explanation.

Figure 1:
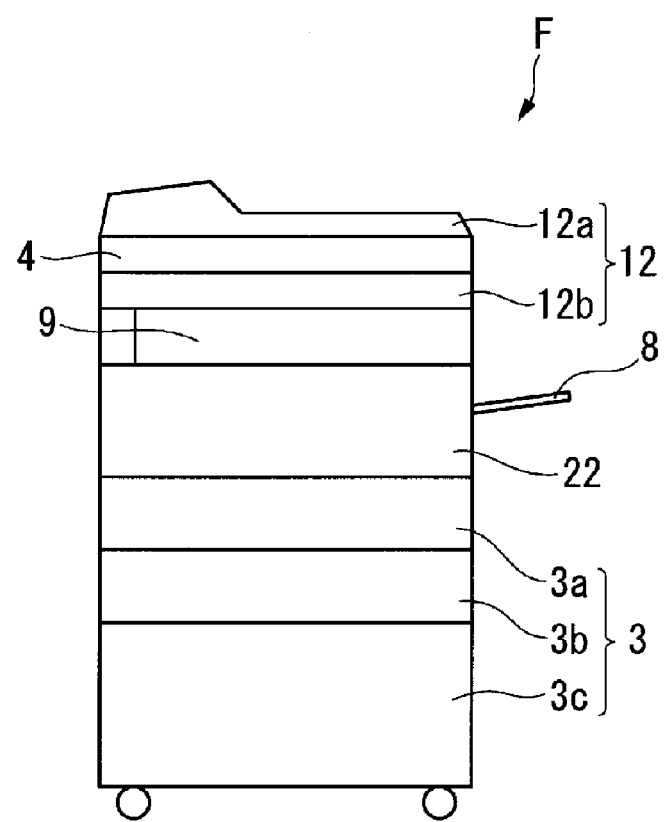
FIG. 1 is a schematic diagram showing a schematic configuration of a multifunction peripheral in an embodiment of the present invention.
Figure 2:
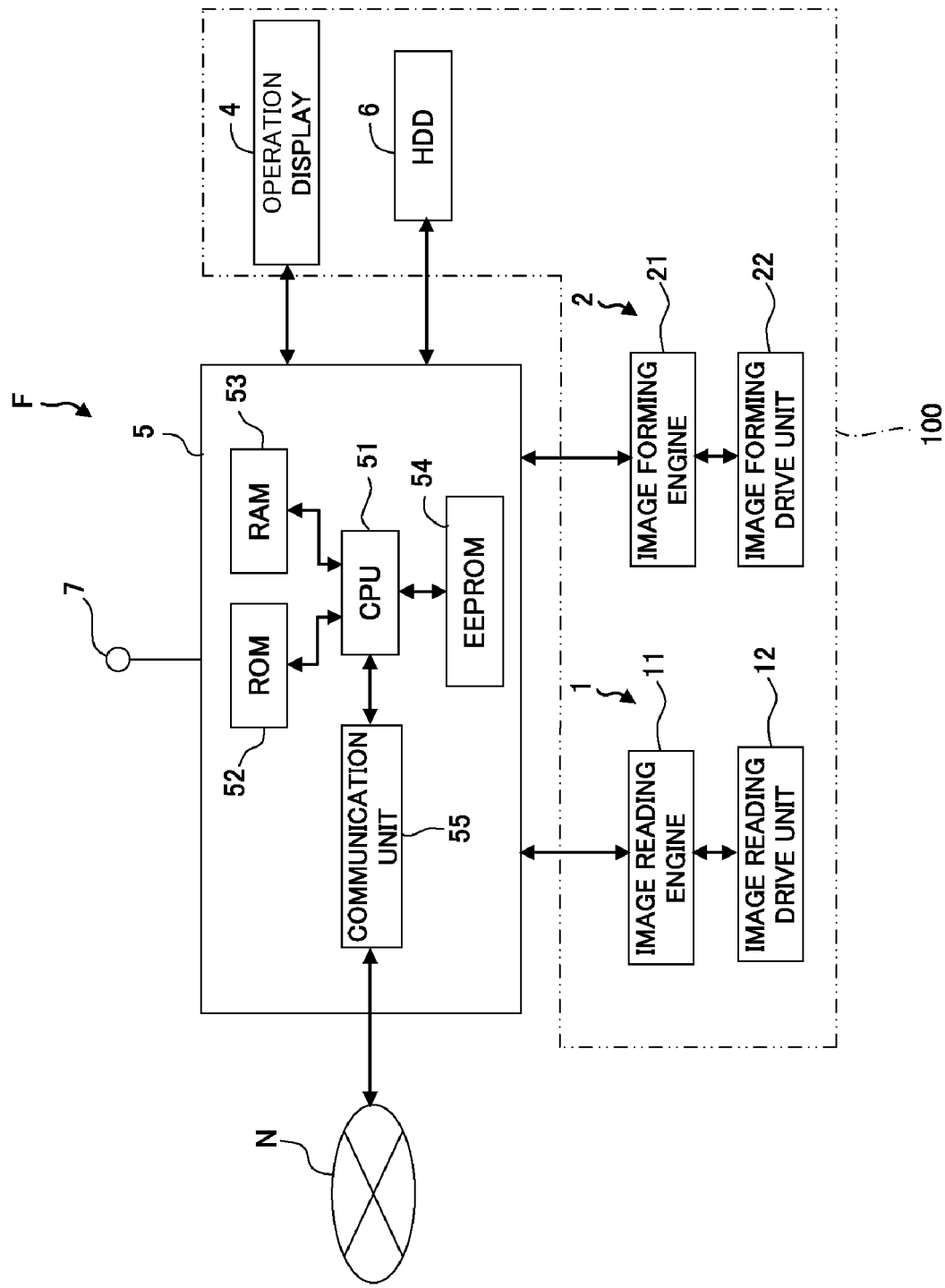
FIG. 2 is a function block diagram of the multifunction peripheral in an embodiment of the present invention.

FIG. 1 is a schematic diagram showing a schematic configuration of a multifunction peripheral in the present embodiment. FIG. 2 is a function block diagram of the multifunction peripheral in the present embodiment.

As shown in these drawings, a multifunction peripheral F in the present embodiment includes an image-reading unit 1, an image-forming unit 2, a cassette 3 (3a to 3c), an operation display 4, a controller 5, a hard disc drive (HDD) 6, and a power source key 7.

The image-reading unit 1 reads an image formed on a document as image data. As shown in FIG. 2, the image-reading unit 1 includes an image-reading engine 11 that performs overall control of the image-reading unit 1 (under the control of the controller 5) and an image-reading drive unit 12 that reads an image formed on a document under the control of the image-reading engine 11.

Further, as shown in FIG. 1, the image-reading drive unit 12 includes a document feeding device 12a, a scanner 12b, etc.

The image-forming unit 2 makes a print (forms an image) on printing paper (recording medium) based on the image data read by the image-reading unit 1, image data input via a network N shown in FIG. 2, etc. The image-forming unit 2 includes an image-forming engine 21 that controls the entire image-forming unit 2 (under the control of the controller 5) and an image-forming drive unit 22 that makes a print on printing paper under the control of the image-forming engine 21.

The image-forming drive unit 22 includes a photosensitive drum on which an electrostatic latent image based on a printed image is formed, a developing device that develops the electrostatic latent image as a toner image by supplying toner to the photosensitive drum, a fixing device that fixes the toner image on printing paper, and so on.

Further, as shown in FIG. 1, a manual paper feed tray 8 that enables manual feed of printing paper is connected to the image-forming drive unit 22.

Then, the printing paper printed by the image-forming drive unit 22 is discharged at a discharge part 9 installed above the image-forming drive unit 22.

The cassette 3 stores printing paper to be supplied to the image-forming unit 2 according to its kind. The cassette 3 is located under the image-forming drive unit 22 as shown in FIG. 1. The cassette 3 in the illustrated embodiment consists of the cassettes 3a to 3c that store different kinds of printing paper.

The operation display 4 is a user interface located so as to be exposed on the surface of the multifunction peripheral F. The operation display 4 includes a touch panel that displays information to be provided to a user, as well as software keys and hardware keys for a user to input an instruction, and so on.

The controller 5 controls the entire multifunction peripheral F in the present embodiment. The controller 5 electrically connects with the image-reading unit 1, the image-forming unit 2, the operation display 4, the HDD 6, and the power source key 7. Further, the controller 5 connects with the network N and electrically connects with terminals of a plurality of users via the network N.

The controller 5 includes a CPU (Central Processing Unit) 51 (processing unit), a ROM (Read Only Memory) 52, a RAM (Random Access Memory) 53 (storage unit), an EEPROM (Electrically Erasable and Programmable Read Only Memory) 54 (storage unit), and a communication unit 55.

The CPU 51 primarily controls the entire controller 5 and the entire multifunction peripheral F. In the present embodiment, the CPU 51 performs setting processing based on setting data stored in the EEPROM 54 when the power-saving mode is switched to the image-forming mode, and performs processing to transfer at least part of the data stored in the HDD 6 when the image-forming apparatus is switched from the image-forming mode to the power-saving mode.

The power-saving mode is a mode that reduces power consumption and powers the controller 5, but does not power the image-reading unit 1, the image-forming unit 2, the operation display 4, or the HDD 6. The image-forming mode is a mode that enables printing on printing paper, and powers the controller 5, the image-reading unit 1, the image-forming unit 2, the operation display 4, and the HDD 6.

The setting data referred to here is data for making various settings in the multifunctional peripheral F. For example, data for setting parameters to control the image-reading unit 1 and the image-forming unit 2 is referred to as setting data. The setting data is generated by an information processing device (not shown) connected with the multifunctional peripheral F via a network. For example, when image formation is desired, an application included in the information processing device is activated and printing conditions are set. The printing conditions include selection of color printing or black-and-white printing etc., in addition to the size of printing paper, the number of copies, and a discharge destination of the printing paper in the image-forming apparatus. When the application issues a print instruction together with the printing conditions, a printer driver included in the information processing device receives it via an operating system included in the information processing device. Then, the printer driver converts the received data into a printer command that the image-forming unit 2 can interpret and transmits it to the image-forming unit. The setting data is stored in the HDD 6, the image-reading engine 11 of the image-reading unit 1, and the image-forming engine 21 of the image-forming unit 2 in the image-forming mode.

The ROM 52 stores programs and various kinds of data used by the CPU 51 to control the multifunction peripheral F. The ROM 52 stores, for example, programs for executing the power-saving mode, programs for executing the image-forming mode, etc.

The RAM 53 temporarily stores data necessary for the CPU 51 to execute various programs and also stores data to be written to the HDD 6 under the control of the CPU 51 in the present embodiment.

The EEPROM 54 (first storage unit) temporarily stores, for example, important data that should not be deleted and also stores setting data input from the network N via the communication unit 55 in the power-saving mode in the present embodiment.

The communication unit 55 is connected directly with the external network N and receives data from outside and transmits internal data under the control of the CPU 51.

The HDD 6 (second storage unit) stores a large capacity of data. In the present embodiment, the HDD 6 stores notification data, such as data indicative of the amount of remaining printing paper in each cassette 3 and data indicative of the kind of printing paper stored in each cassette 3.

The notification data referred to here is data indicative of the state of the multifunction peripheral F. In addition to the HDD 6, the image-reading engine 11 of the image-reading unit 1 and the image-forming engine 21 of the image-forming unit 2 also store such notification data.

The power source key 7 is a switch for switching between the power-saving mode and the image-forming mode by an operation of a user. The power source key 7 is located in the vicinity of the operation display 4.

When the image-forming mode is switched to the power-saving mode in the present embodiment, the image-reading unit 1, the image-forming unit 2, the operation display 4, the controller 5, and the HDD 6 are initially powered as described above. Then, power is removed from the image-reading unit 1, the image-forming unit 2, the operation display 4, and the HDD 6. As a result, the reduction in the amount of power consumption is achieved.

That is, in the multifunction peripheral F of the present embodiment, the controller 5 corresponds to the continuously-powered unit in the present invention and the image-reading unit 1, the image-forming unit 2, the operation display 4, and the HDD 6 correspond to the non-continuously-powered unit 100 in the present invention (refer to FIG. 2).

Next, the operation of the multifunction peripheral F in the present embodiment configured as described above will be described. Since the printing operation of the multifunction peripheral F in the present embodiment is the same as that of the conventional multifunction peripheral F, in the following description, the operational characteristics of the multifunction peripheral F in the present embodiment will be described, such as operation in the power-saving mode, operation when the energy-saving mode is switched to the image-forming mode, and operation when the image-forming mode is switched to the power-saving mode.

The operation in the energy-saving mode will be described with reference to the flowchart in FIG. 3. The operation when the power-saving mode is switched to the image-forming mode will be described with reference to the flowchart in FIG. 4. The operation when the image-forming mode is switched to the power-saving mode will be described with reference to the flowchart in FIG. 5.

Figure 3:
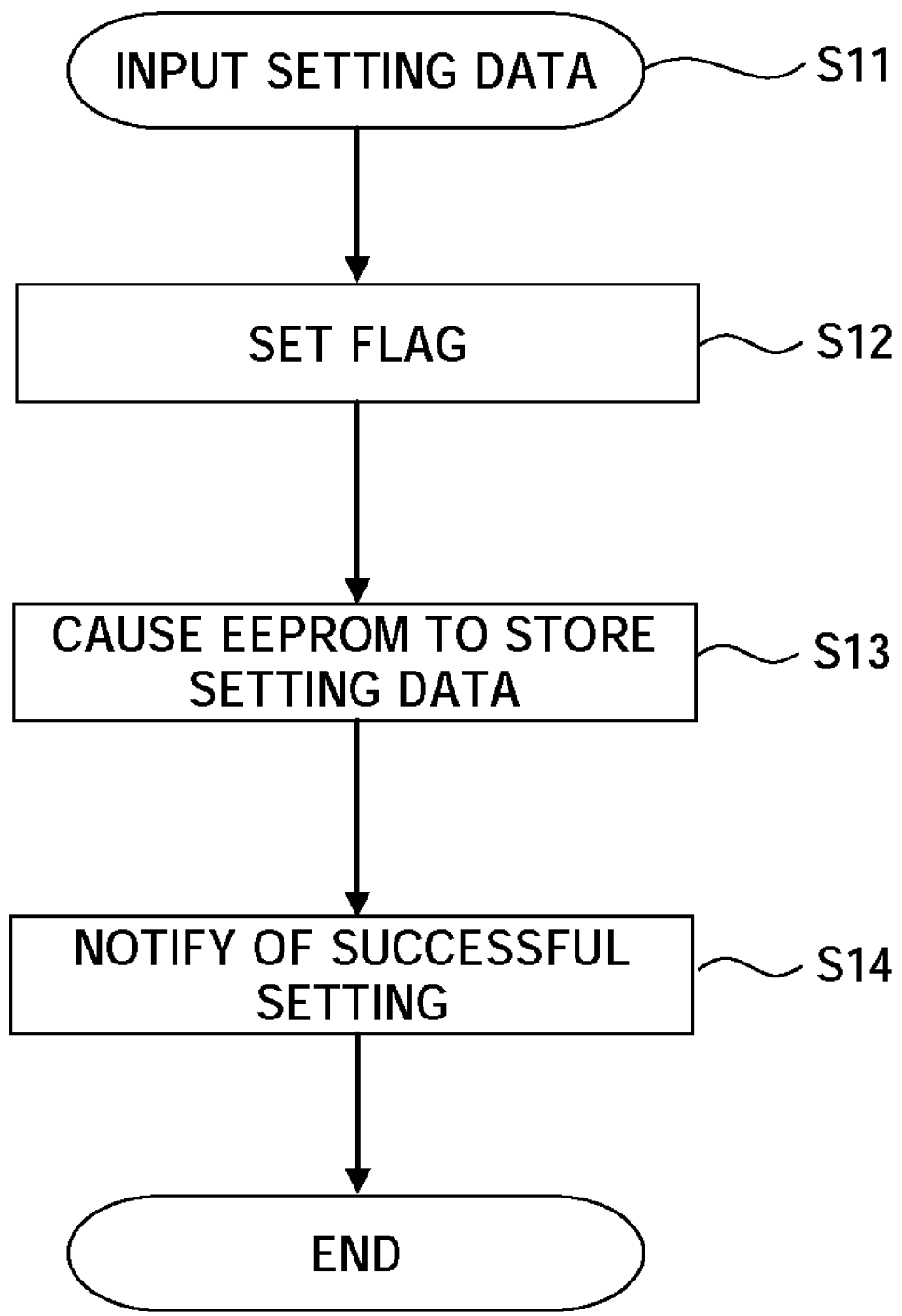
FIG. 3 is a flow chart for explaining the operation in a power-saving mode of the multifunction peripheral in an embodiment of the present invention.

As shown in FIG. 3, in the power-saving mode, when setting data is received from the network N via the communication unit 55 (step S11), the CPU 51 sets a flag indicating that setting data is inputted (step S12). Then, the CPU 51 causes the EEPROM 54 to store the setting data and the flag (step S13).

When the setting data stored in the HDD 6, the setting data of the image-reading unit 1, and the setting data of the image-forming unit 2 have been previously transferred to the EEPROM 54 in the power-saving mode, the CPU 51 overwrites this previously stored setting data in the EEPROM 54 in step S13. As a result, the CPU 51 causes the EEPROM 54 to store the newly received setting data.

After the setting data is stored in the EEPROM 54 in this manner, the CPU 51 notifies the user who input the setting data via the network N by transferring data to the user's terminal indicating that the setting has been successfully made. (step S14).

In step S14, the CPU 51 may also transfer data to the user's terminal indicating that the multifunction peripheral F is in the power-saving mode. This makes it possible for the user to recognize that the multifunction peripheral F is in the power-saving mode.

Figure 4:
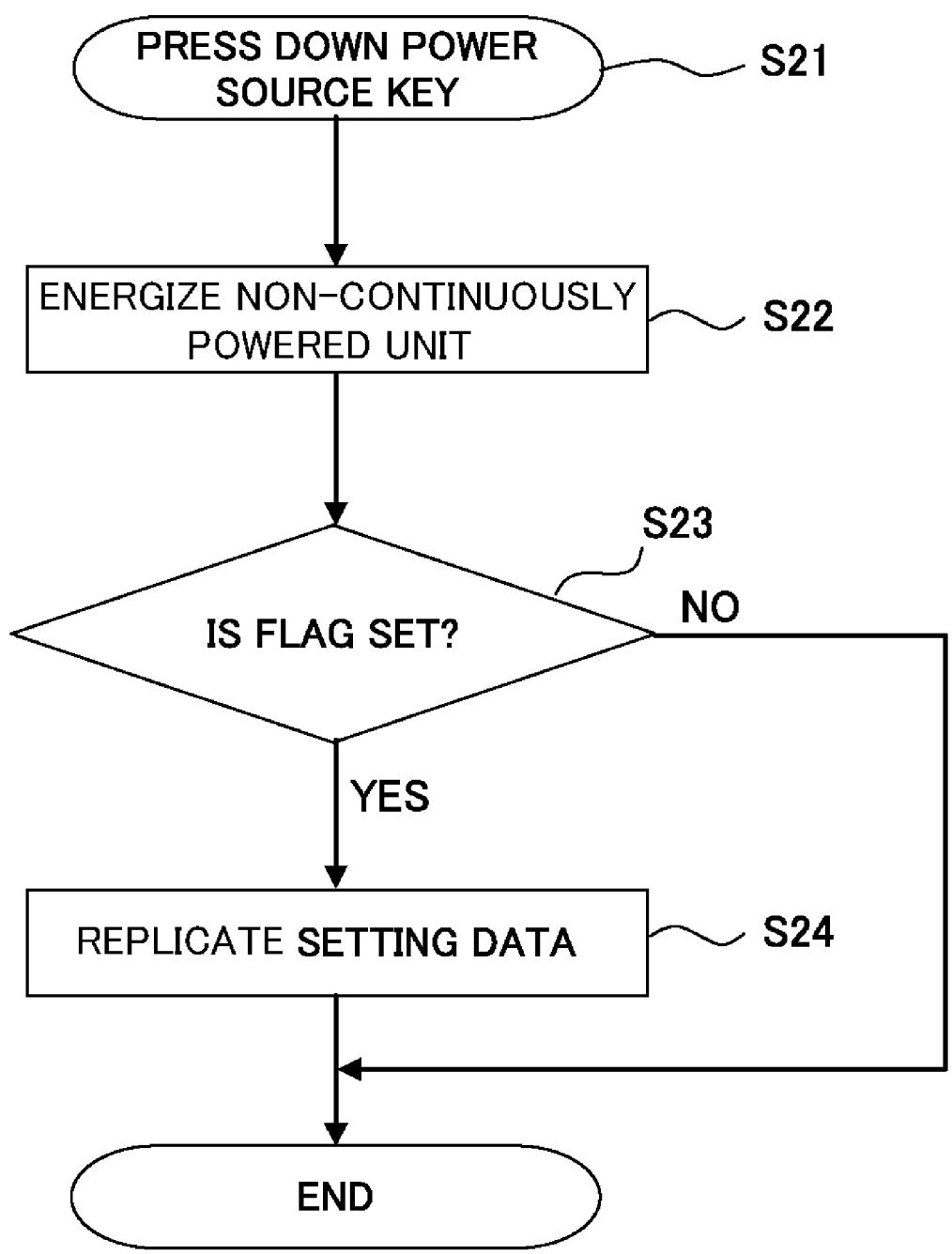
FIG. 4 is a flow chart for explaining the operation when the power-saving mode is switched to an image-forming mode of the multifunction peripheral in an embodiment of the present invention.

The operation to switch the power-saving mode to the image-forming mode starts when a user presses down the power source key 7 in the state of the power-saving mode as shown in FIG. 4 (step S21).

When the operation to switch the power-saving mode to the image-forming mode starts, the CPU 51 first starts to energize the image-reading unit 1, the image-forming unit 2, the operation display 4, and the HDD 6 (non-continuously-powered unit 100) (step S22).

Subsequently, the CPU 51 checks whether a flag is set to the EEPROM 54 (step S23). If a flag is set, the setting data stored in the EEPROM 54 is replicated (step S24) and the operation to switch the power-saving mode to the image-forming mode is ended.

When a flag is not set in step S23, the CPU 51 ends the operation to switch the power-saving mode to the image-forming mode.

As described above, in the multifunction peripheral F in the present embodiment, even in the power-saving mode, setting data from outside is received because the controller 5 is powered. Then, the input setting data is stored temporarily in the EEPROM 54 included in the controller 5. When the power-saving mode is switched to the image-forming mode, the CPU 51 replicates the stored setting data from the EEPROM 54.

That is, even when setting data is input from outside via the communication unit 55, the setting data is maintained in the EEPROM 54 included in the controller 5 until the mode is switched to the image-forming mode.

Consequently, even when setting data is input from outside in the power-saving mode, it is unlikely that the power-saving mode would be cancelled.

As a result, according to the multifunction peripheral F in the present embodiment, it is made possible to further reduce power consumption in the multifunction peripheral F.

In the multifunction peripheral F in the present embodiment, setting data and a flag are stored in the EEPROM 54, a nonvolatile memory.

Consequently, even if the supply of power to the multifunction peripheral F is completely terminated in the power-saving mode, it is possible to preserve setting data and a flag.

Accordingly, when the mode is switched to the image-forming mode again, it is possible to recover without fail the setting data input via the network N.

Further, even if a second user presses down the power source key 7 to forcibly switch the mode to the power-saving mode during the period in which setting data is being input by a first user via the network N in the image-forming mode, the first user can continue inputting of the setting data. This is because the setting data is written to the EEPROM of the controller 5, which is the continuously powered unit. Furthermore, when the power-saving mode is switched to the image-forming mode, it is possible to recover the setting data without fail.

Figure 5:
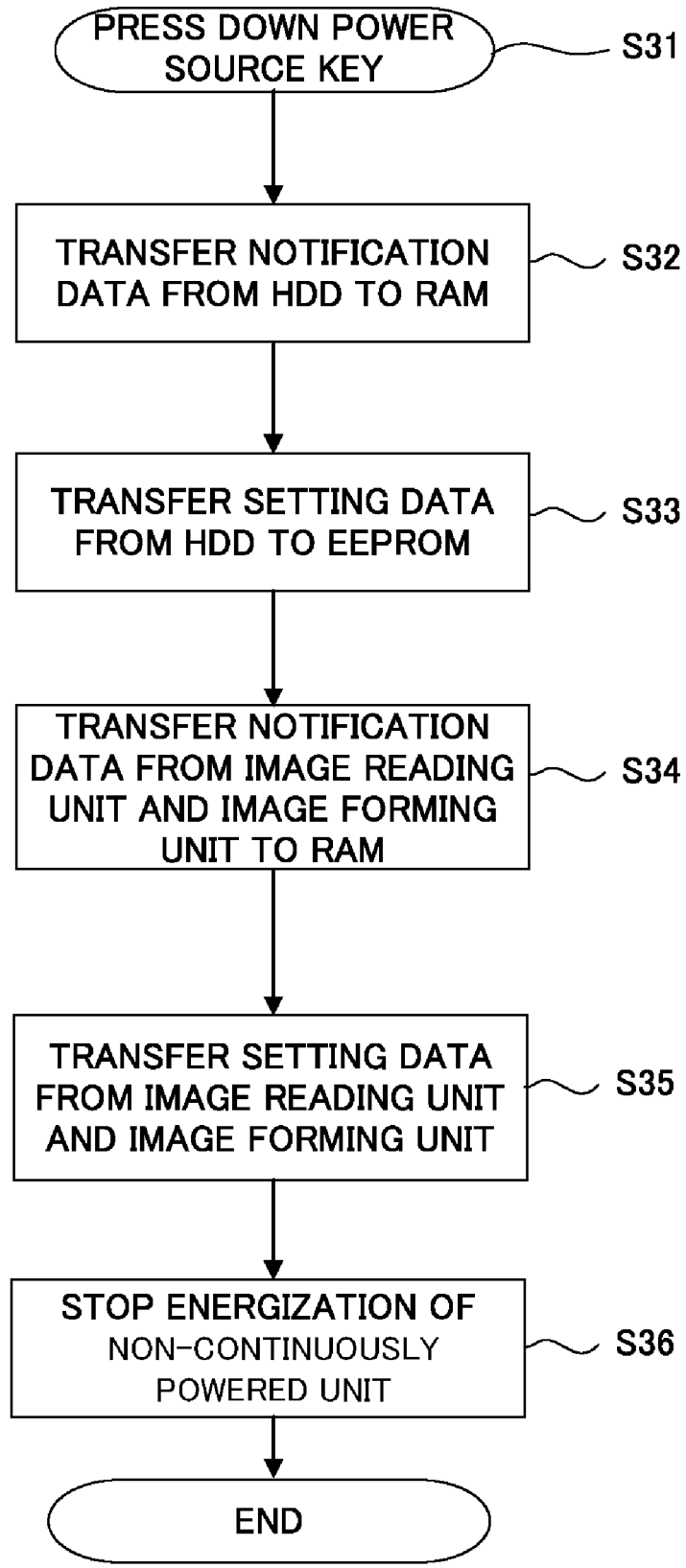
FIG. 5 is a flow chart for explaining the operation when the image-forming mode is switched to the power-saving mode of the multifunction peripheral in an embodiment of the present invention.

Next, as shown in FIG. 5, the operation to switch the image-forming mode to the power-saving mode starts when a user presses down the power source key 7 in the state of the image-forming mode (step S31).

When the operation to switch the image-forming mode to the power-saving mode starts in this manner, the CPU 51 first transfers notification data from the HDD 6 to the RAM 53 (third storage unit, step S32) and further transfers setting data from the HDD 6 to the EEPROM 54 (step S33).

Subsequently, the CPU 51 transfers the notification data from the image-reading unit 1 and the image-forming unit 2 to the RAM 53 (step S34) and further transfers the setting data from the image-reading unit 1 and the image-forming unit 2 to the EEPROM 54 (step S35).

Then, the CPU 51 stops powering the image-reading unit 1, the image-forming unit 2, the operation display 4, and the HDD 6 (i.e., the non-continuously-powered unit 100) (step S36) and the operation to switch the image-forming mode to the power-saving mode is ended.

As described above, by storing the notification data and setting data of the image-reading unit 1, the image-forming unit 2, and the HDD 6 in the RAM 53 or the EEPROM 54 of the controller 5 (the continuously-powered unit), it is made possible for a user to confirm the notification data and setting data via the network N while maintaining the power-saving mode.

Although the embodiment of the present invention is described in detail with reference to the drawings as above, the specific configuration is not limited to the above-mentioned embodiment. Rather, the design thereof can be modified without departing from the gist of the present invention.

For example, in the above-mentioned embodiment, a multifunction peripheral was described as an example of the image-forming apparatus of the present invention.

However, the present invention is not limited to a multifunction peripheral, but can instead be applied to other types of image-forming apparatus, such as copy machines, printers, and facsimile machines.

In the above-mentioned embodiment, the data input to the controller 5 via the network N in the power-saving mode was only described as being "setting data".

However, the present invention is not so limited; therefore, the data input to the controller 5 via the network N in the power-saving mode may be data different from setting data.

In the above-mentioned embodiment, the image-forming apparatus was switched between the power-saving mode and the image-forming mode by pressing down the power source key 7.

However, the present invention is not limited to this configuration and may instead be done from the terminal of a user.

Further, it may also be possible to configure the image-forming apparatus so that switching from the image-forming mode to the power-saving mode happens when image formation is not performed for a predetermined period of time.

The present invention summarized from each of the above-mentioned embodiments is as follows. An image-forming apparatus according to an embodiment of the present invention is characterized by having an image-forming mode during which an image is formed on a recording medium and a power-saving mode in which power consumption is reduced relative to in the image-forming mode. The image-forming apparatus comprises a continuously-powered unit powered in the image-forming mode and the power-saving mode and a non-continuously-powered unit powered in the image-forming mode but not powered in the power-saving mode. The continuously-powered unit includes: a communication unit connected with an external network; a storage unit storing setting data for making setting to the continuously-powered unit and non-continuously-powered unit when the setting data is received from the external network via the communication unit; and a processing unit performing processing based on the setting data stored in the storage unit when the image-forming apparatus is switched from the power-saving mode to the image-forming mode by an external operation.

In some embodiments, the storage unit may be a nonvolatile memory.

Further, it may also be possible for the processing unit to transfer at least part of data stored in the storage unit included in the non-continuously powered unit to the storage unit of the continuously powered unit when the image-forming apparatus is switched from the image-forming mode to the power-saving mode.

What is claimed is:

1. An image-forming apparatus having an image-forming mode during which an image is formed on a recording medium and a power-saving mode in which power consumption is reduced relative to in the image-forming mode, the apparatus comprising:

a continuously-powered unit powered in both the image-forming mode and the power-saving mode; and
a non-continuously-powered unit powered in the image-forming mode but not in the power-saving mode,
wherein the continuously-powered unit includes:
a communication unit connected with an external network;
a first storage unit storing setting data when the setting data is received from the external network via the communication unit during the power-saving mode, wherein the setting data is for making settings in the continuously-powered unit and non-continuously-powered unit; and
a processing unit using the setting data to perform processing when an external operation switches the image-forming apparatus from the power-saving mode to the image-forming mode.

2. The image-forming apparatus according to claim 1, wherein the first storage unit is a nonvolatile memory.

3. The image-forming apparatus according to claim 1, further comprising a second storage unit included within the non-continuously-powered unit, wherein the second storage unit stores setting data when the setting data is received from the external network via the communication unit during the image-forming mode.

4. The image-forming apparatus according to claim 3, wherein the processing unit transfers at least part of the setting data stored in the second storage unit to the first storage unit when the image-forming apparatus is switched from the image-forming mode to the power-saving mode.

5. The image-forming apparatus according to claim 2, further comprising a second storage unit included within the non-continuously-powered unit, wherein the second storage unit stores setting data when the setting data is received from the external network via the communication unit during the image-forming mode.

6. The image-forming apparatus according to claim 5, wherein the processing unit transfers at least part of the setting data stored in the second storage unit to the first storage unit when the image-forming apparatus is switched from the image-forming mode to the power-saving mode.

7. A method for reducing power consumption in an image-forming apparatus, wherein the image-forming apparatus has an image-forming mode during which an image is formed on a recording medium and a power-saving mode in which power consumption is reduced relative to in the image-forming mode, the method comprising:

switching from the image-forming mode to the power-saving mode;
transferring setting data to a first storage unit from a second storage unit, wherein the first storage unit is located within a continuously-powered unit of the image-forming apparatus, wherein the second storage unit is located within a non-continuously-powered unit of the image-forming apparatus, and wherein the setting data is for making settings in the continuously-powered unit and non-continuously-powered unit;
stopping power to the non-continuously-powered unit, wherein the non-continuously-powered unit comprises at least an image-reading unit, an image-forming unit, the second storage unit, and an operation display; and
overwriting the setting data in the first storage unit upon receiving new setting data from a user terminal connected to the image-forming apparatus via a network, wherein the image-forming apparatus is connected to the network via a communication unit, wherein the communication unit is part of the continuously-powered unit.

8. The method according to claim 7, wherein the first storage unit is a nonvolatile memory.

9. The method according to claim 7, wherein power to the non-continuously-powered unit remains stopped throughout the overwriting step.

10. The method according to claim 7, further comprising:
switching from the power-saving mode to the image-forming mode upon occurrence of an external operation;
powering the non-continuously-powered unit; and
performing processing on at least one of the image-reading unit and the image-forming unit using the setting data.

11. The method according to claim 7, wherein the continuously-powered unit comprises the first storage unit, the communication unit, and a processing unit that uses the setting data to perform processing when an external operation switches the image-forming apparatus from the power-saving mode to the image-forming mode.

12. The method according to claim 7, wherein overwriting the setting data comprises:
setting a flag;
storing the setting data in the first storage unit; and
sending data to the user terminal via the communication unit and network to provide notification of a successful setting.

13. The method according to claim 7, further comprising transferring notification data from the second storage unit to a third storage unit.

14. The method according to claim 13, further comprising:
transferring notification data from the image-reading unit and the image-forming unit to the third storage unit; and
transferring setting data from the image-reading unit and the image-forming unit to the first storage unit.

15. The method according to claim 7, further comprising providing notification that the image-forming apparatus is in the power-saving mode.

16. A controller for an image-forming apparatus, the image-forming apparatus comprising an image-reading unit, an image-forming unit, a hard disc drive, and an operation display and having an image-forming mode during which an image is formed on a recording medium and a power-saving mode in which power consumption is reduced relative to in the image-forming mode, the controller comprising:
a non-volatile memory for storing setting data while the image-forming apparatus is in the power-saving mode;
a volatile memory for storing notification data while the image-forming apparatus is in the power-saving mode;
a communication unit for receiving data from a plurality of user terminals over a network; and
a processing unit for using the setting data to perform processing when an external operation switches the image-forming apparatus from the power-saving mode to the image-forming mode, and for stopping power to the image-reading unit, the image-forming unit, the hard disc drive, and the operation display when the image-forming apparatus switches from the image-forming mode to the power-saving mode.

17. The controller according to claim 16, wherein the processing unit further transfers at least part of data stored on the hard disc drive to the non-volatile memory and the volatile memory when the image-forming apparatus switches from the image-forming mode to the power-saving mode.

18. The controller according to claim 16, wherein the setting data includes data for setting parameters to control the image-reading unit and the image-forming unit.

19. The controller of claim 18, wherein the setting data is generated by an information processing device connected to the image-forming apparatus via the network.

20. The controller of claim 18, wherein the notification data is indicative of a state of the image-forming apparatus.

* * * * *